2,753,311

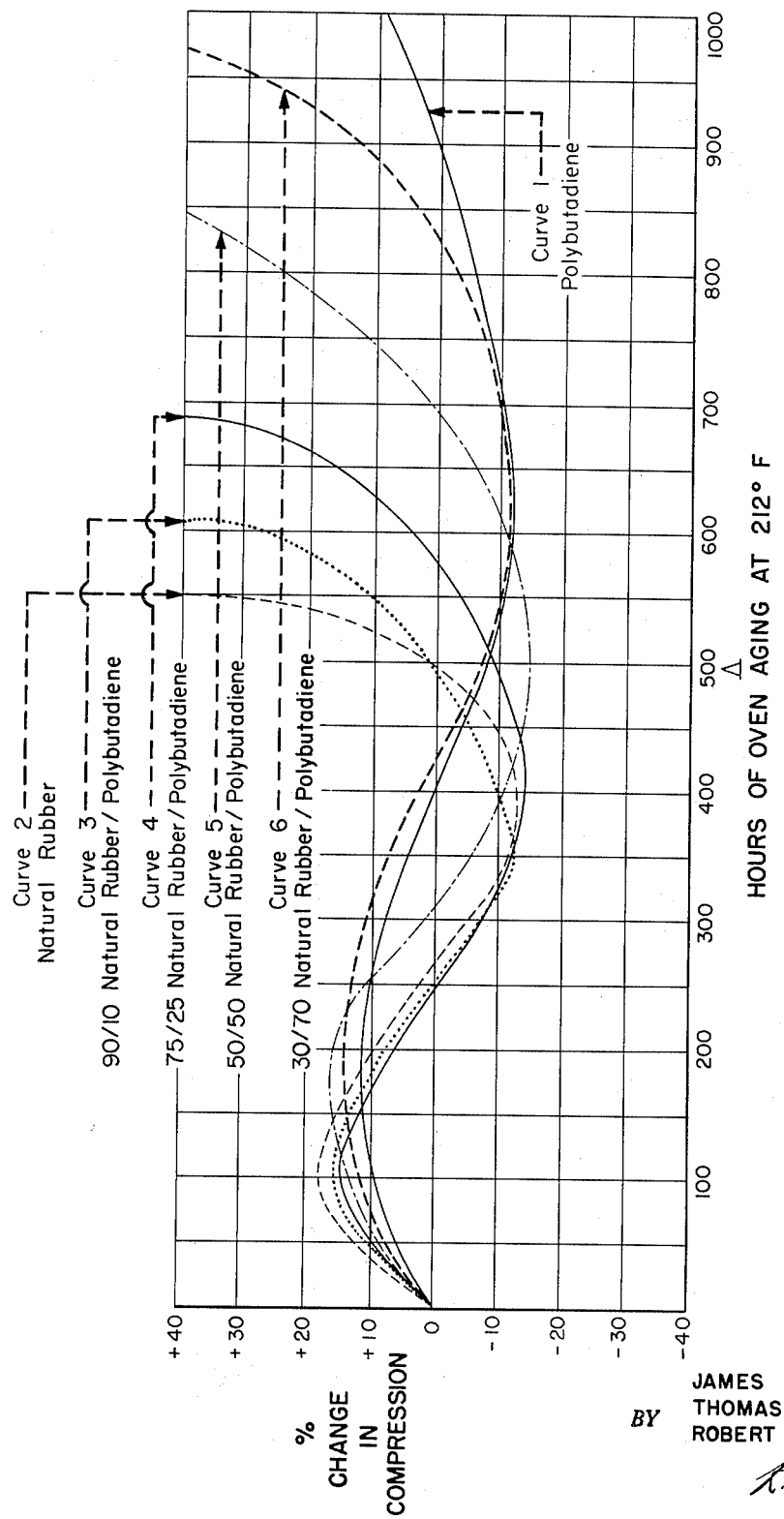

FOAMED RUBBER LATEX SPONGE CONTAINING POLYBUTADIENE AND NATURAL RUBBER

Thomas H. Rogers, Jr., and James D. D'Ianni, Akron, and Robert M. Pierson, Ravenna, Ohio, assignors, by mesne assignments, to The Goodyear Tire & Rubber Company, a corporation of Ohio Application November 17, 1951, Serial No. 256,852

6 Claims. (Cl. 260—2.5)

This invention relates to the manufacture of foamed synthetic rubber latex sponge having improved odor characteristics.

It it well-known to make foamed rubber latex sponge by compounding a rubber latex or blends of rubber latices with sulfur, antioxidants, accelerators, activating agents, softeners, loading agents, and soaps; frothing the latex mix by introducing air or other gas by any of the methods known to the art; gelling the foamed latex froth by any of the various techniques used in producing frothed latex sponge as, for example, with salt gelants such as $Na_2SiF_6$, $NH_4NO_3$, or with gaseous gelants such as $CO_2$, or by freezing; vulcanizing the gelled latex froth by any of the practical methods known in the art, such as by steam, hot water, high frequency electricity, dry heat, etc.; washing the vulcanized, gelled latex froth (now referred to as foamed rubber latex sponge) in water; and finally drying the foamed latex sponge in either an oven, or by means of high frequency electricity, or by infra red lamps, or by any other practical method.

Natural rubber latex has been the principal elastomer used in producing foamed rubber latex sponge. Synthetic elastomer latices such as the rubbery copolymers of butadiene-1,3 and styrene, which are commonly known in the art as GR-S latices, and synthetic elastomer latices such as the rubbery copolymers of butadiene-1,3 and acrylonitrile, which are usually referred to in the art as GR-A or Buna N latices, and synthetic elastomer latices such as poly-(2-chloro-butadiene-1,3) which are usually known under the trade name of neoprene and GR-M, have been used commercially in producing foamed rubber latex sponge. In most cases the synthetic latices are used in blends with natural rubber in order to make them useful for furniture cushions, mattresses, pillows, automobile cushions, undercarpet padding, and the like. Foamed rubber latex sponge made entirely from natural rubber latex has advantage in tensile and elongation as compared to foamed latex sponge consisting in whole or in part of one of the commonly used synthetic rubber latices.

However, the most serious disadvantage of foamed rubber latex sponge containing synthetic rubber has been the odor. If a foamed rubber latex sponge contains as little as 5% of one of the commonly used synthetic latex rubbers, it has an odor that is most objectionable. Various methods have been used in trying to neutralize or eliminate the odor. The use of deodorants and/or masking odorants is most common. However, this method is very unsatisfactory from the "selective" point of view inasmuch as what is a pleasant odor to one person is unpleasant to another. Also, another serious disadvantage to this method is the deodorant or masking odorant "buildup." Inasmuch as foamed rubber latex sponge consists of reticular, interconnecting cells having a very large surface, when the sponge is confined to a small space, such as inside a furniture cover, the odor resulting from the deodorant and/or odorant tends to build up and the concentrated scent is most objectionable.

Thoroughly washing the vulcanized foamed rubber latex sponge in either water or in water which has been treated with a soap, a synthetic soap, a detergent or a wetting agent, generally improves the odor of a foamed rubber latex sponge containing synthetic rubber but does not completely remove the so-called "synthetic smell." Also, the thorough washing tends to leach valuable chemicals from the sponge and this results in lower compression and decreased aging properties.

Consequently, because of the "bad odor" of foamed rubber latex sponge containing synthetic rubber, the manufacture and use of such sponge has been severely limited. It is usually used in making automobile cushions and in a few miscellaneous applications. Furniture cushions, mattresses, and pillows are made almost entirely from natural rubber latex. Even natural rubber latex sponge has a odor objectionable to many, although it is an odor different than the odor possessed by synthetic rubber latex sponge. Natural rubber latex sponge has a characteristic "protein-like" odor. Also, this protein odor may be more pronounced with different batches of natural rubber latex. It is especially noticed when the sponge has been made from a batch of natural rubber latex that has been in storage for six or more months.

According to the present invention foamed latex sponge may be made, in whole or in part, from a synthetic rubber latex and the sponge has no objectionable odor or scent. The foamed latex sponge made by this invention may be used in pillows, mattresses, furniture cushions, and other places where formerly a foamed synthetic latex sponge was barred because of odor. Also, we have found that the foamed latex sponge of this invention has a greatly improved aging life as compared to foamed latex sponge made from all natural rubber latex.

It has now been discovered that polybutadiene latex may be used for producing foamed latex sponge having an improved odor characteristic. The polybutadiene latex may be used in whole or in part with natural rubber latex as the other rubber component. The polybutadiene latex used in this invention may be made by any of the known processes for emulsion polymerization of butadiene-1,3, such as is used in the so-called "hot" systems where the polymerization proceeds at temperatures up to 130° F., and in the socalled "cold" systems where the polymerization proceeds at temperatures up to 55° F. It is preferred that the rubber solids of the compounded latex frothing mix be at least 45% on a weight basis. Consequently, if the foamed latex sponge is to be made using all polybutadiene latex, the rubber solids of the latex must be sufficiently high so that when the latex is completely compounded for frothing the rubber solids of the latex mix is at least 45% by weight. With the dilution resulting from the soaps, compounding dispersions, and other chemicals, it is desirable to have a polybutadiene latex of at least 50% rubber solids by weight. However, if the polybutadiene latex is to be blended in small quantities with a high solids natural rubber latex, the rubber solids of the polybutadiene latex may be considerably less.

The odor of each foam rubber latex sponge prepared in the examples below was determined by allowing the sponge to remain at room temperature for 48 hours and then sealing the sponge sample in a pint Mason jar and allowing it to stand for 72 hours at room temperature. The jar was then opened and the odor of the contents was determined in accordance with the following scale:

SCALE OF ODOR INTENSITIES

| Degree | Intensity | Description |
| --- | --- | --- |
| 0 | No odor | No detectable odor. |
| 1 | Very faint | Minimum, but positively perceptible odor. |
| 2 | Faint | Weak odor, readily perceptible. |
| 3 | Easily noticeable | Moderate intensity. |
| 4 | Strong | Cogent, forceful odor. |
| 5 | Very strong | Intense effect, may irritate. |

The accompanying drawing shows the long-term aging properties of the foamed latex sponge made in accordance with the examples set forth below. Curves 1, 2, 3, 4, 5 and 6 represent the aging properties possessed by the sponges made in Examples 1, 2, 7, 8, 9 and 10 respectively.

The following examples are used to illustrate our invention. The synthetic latices used in these examples have been stripped to eliminate any residual monomers.

Example 1

To (1) 170 grams of a latex (100 grams dry rubber) made by emulsion polymerization of butadiene-1,3 at 50° F., which was heat concentrated to a rubber solids of 59% by weight, was added (2) 2 grams of a water solution of potassium oleate soap of 20% active solids, (3) 4 grams of a water solution of potassium rosinate soap of 20% active solids, (4) 1 gram of a water dispersion of finely divided zinc diethyldithiocarbamate of 50% active solids, (5) 4 grams of a water dispersion of finely divided mercaptobenzothiazole of 50% active solids, (6) 4 grams of a water dispersion of finely divided sulfur of 50% active solids, and (7) 2 grams of a water dispersion of finely divided symmetrical di-beta-naphthyl-paraphenylene diamine of 50% active solids. Items 1 to 7 inclusive were added to the latex in the order given and with slight agitation until they were thoroughly mixed throughout the latex mass. This mix was allowed to stand for 24 hours at room temperature to undergo what is generally referred to as "maturing." For convenience this may be called the "frothing synthetic latex mix."

The "frothing synthetic mix" was placed in the conventional frothing bowl and air was introduced by a rotating, elliptical shaped beater consisting of wires. After the desired density was reached, and while the latex was still undergoing the stirring action, (8) 10 grams of a water dispersion of finely divided zinc oxide of 50% active solids was added along with (9) 1 gram of a water dispersion of finely divided diphenylguanidine of 30% active solids. The mixing was allowed to proceed for two minutes after these two additions. There was then added (10) 20 grams of a water dispersion of finely divided sodium fluosilicate of 28% active solids. This item was stirred into the mix for two minutes. The latex foam was poured onto metal plates and after six minutes at room temperature the liquid latex foam "set" into an irreversible gel condition. The gelled foam was vulcanized in a steam autoclave at 250° F. for 15 minutes. It was washed in warm water, squeezed to eliminate as much water as possible, and dried in a 220° F. circulating air oven for 2½ hours. The foamed latex sponge made according to this example had an odor intensity approaching zero and showed outstanding long-term aging characteristics as indicated in the drawing by curve 1.

Example 2

A foamed rubber latex sponge made according to Example 1 but using concentrated natural rubber latex had a slight protein odor intensity between two and approaching one and inferior long-term aging characteristics as compared to the polybutadiene latex foamed sponge as indicated in the drawing by curve 2.

Example 3

A foamed rubber latex sponge made according to Example 1 but using a concentrated synthetic rubber latex made by emulsion copolymerizing at 50° F. of 70 parts of butadiene-1,3 and 30 parts of styrene, generally known as a "cold" GR-S type latex, had an odor intensity of 3.

Example 4

A foamed rubber latex sponge made according to Example 1 but using a 50% natural/50% "cold" GR-S latex blend, the natural being the same as described in Example 2 and the "cold" GR-S being the same as described in Example 3, had an odor intensity between 2 and 3 and approaching 3 and which is entirely unsuited for use as pillows, mattresses, and the like.

Example 5

A foamed rubber latex sponge made according to Example 1 but using a 95% natural/5% "hot" GR-S latex blend, the natural being that described in Example 2 and the "hot" GR-S latex being the commercially available Type V material, had an odor intensity between 2 and 3 and approaching 3. Type V latex is prepared by emulsion polymerization of a soap stabilized mixture containing 70% butadiene and 30% styrene at 120° F. to at least 58% solids.

Example 6

A foamed rubber latex sponge made according to Example 1 but using a concentrated synthetic rubber latex made by emulsion copolymerizing at 50° F. of 97 parts of butadiene-1,3 and 3 parts of styrene had an odor intensity of 3.

Example 7

A foamed rubber latex sponge, made according to Example 1, but using a 90% natural/10% "hot" type polybutadiene latex (butadiene-1,3 emulsion polymerized at 120° F.) blend had an odor intensity between 1 and zero and approaching zero. It also had an improved long-term aging as indicated in the drawing by curve 3.

Example 8

A foamed rubber latex sponge made according to Example 1, but using a 75% natural/25% "hot" type polybutadiene latex blend, had an odor intensity between 1 and zero and approaching zero. It also had an improved long-term aging as indicated in the drawing by curve 4.

Example 9

A foamed rubber latex sponge made according to Example 1, but using a 50% natural/50% "hot" type polybutadiene latex blend, had an odor intensity between 1 and zero and approaching zero. It also had an improved long-term aging as shown in the drawing by curve 5.

Example 10

A foamed rubber latex sponge made according to Example 1, but using a 30% natural/70% "hot" type polybutadiene latex blend, had an odor intensity between 1 and zero and approaching zero. It also had a very good long-term aging as shown in the drawing by curve 6.

Example 11

A foamed rubber latex sponge made according to Example 1, but using a methyl-2-butadiene-1,3 (isoprene) polymer made by emulsion polymerization at 51° F. and concentrated by heat evaporation to obtain sufficiently high solids, had an odor intensity of 3.

The drawing shows the long-term aging life of the foamed rubber latex sponge. The long-term aging was determined by cutting a 3-inch diameter disc from a 1-inch thick sponge slab. The original compression at 25% deflection was observed and the sample was put in an air-circulating oven at 212° F. At various periods of time the compression of the sponge sample was taken at room temperature and plotted as shown in the drawing. At +30% compression change, after the sponge reached the lowest compression and was again increasing, the sponge began to get brittle. This brittle point was the "end point" of the long-term aging test.

The improved foamed latex sponge of this invention may be made containing from about 10% up to 100% of polybutadiene blended with 90% and down to 0% of natural rubber. Sponge of 100% polybutadiene possesses improved odor and long-term aging as shown in Example 1. Sponges containing less than 100% polybutadiene and down to 10% all possess the improved odor and long-term aging characteristics as described in the examples.

It is also observed that all homopolymer diene-1,3 latices may not be used in making a sponge product having a desirable odor, as has been shown by Example 11 using isoprene. It is also apparent that the improved odor is directly associated with the polybutadiene content of the sponge. Although polybutadiene rubber and polybutadiene latex as such have been known to rubber manufacturers, the makers of frothed latex sponge have always used butadiene-1,3 copolymers such as butadiene/styrene, butadiene/acrylonitrile, as well as polychlorobutadiene latices in their products. It was undoubtedly thought that a polybutadiene latex would have little or no value in foamed latex sponge. This invention presents to the art a means of making a foamed rubber latex sponge containing synthetic rubber which does not have the objectionable scent possessed by foamed rubber latex sponge not made in accordance with this invention. Besides having a better "odor" than sponge made wholly from natural rubber latex, it is actually much better in long-term aging properties. The odor of synthetic rubber latex is very pronounced and disagreeable. In the latex form there is very little difference between the odor of polybutadiene and the odor of copolymers of butadiene-1,3 and styrene—both being most objectionable. However, although there was no reason to anticipate such a result, in the finished foamed latex sponge the polybutadiene-containing sponge has a more desirable odor than does the sponge containing butadiene-1,3/styrene copolymers.

While certain representative embodiments and details have been shown for the purpose of illustrating the invention, it will be apparent to those skilled in this art that various changes and modifications may be made therein without departing from the spirit or scope of the invention.

What is claimed is:

1. Foamed rubber latex sponge comprising at least 10 and not more than 90 parts by weight of polybutadiene and up to 90 and not less than 10 parts by weight of natural rubber.

2. Foamed rubber latex sponge comprising 90 parts by weight of polybutadiene and 10 parts by weight of natural rubber.

3. Foamed rubber latex sponge comprising 75 parts by weight of polybutadiene and 25 parts by weight of natural rubber.

4. Foamed rubber latex sponge comprising 50 parts by weight of polybutadiene and 50 parts by weight of natural rubber.

5. Foamed rubber latex sponge comprising 30 parts by weight of polybutadiene and 70 parts by weight of natural rubber.

6. A foamed rubber latex sponge having an odor intensity ranging from odorless to not more than very faint and having not more than a 10% increase in resistance to compression after aging the sponge at 212° F. for 550 hours, the sponge comprising from 10 to 90 parts by weight of polybutadiene and from 90 to 10 parts by weight of natural rubber.

References Cited in the file of this patent

UNITED STATES PATENTS

| | | |
|---|---|---|
| 2,175,798 | Hauser | Oct. 10, 1939 |
| 2,444,869 | Clayton | July 6, 1948 |
| 2,567,950 | Stauffer | Sept. 18, 1951 |
| 2,567,952 | Lewis | Sept. 18, 1951 |
| 2,567,988 | Bethe | Sept. 18, 1951 |
| 2,594,217 | Rogers et al. | Apr. 22, 1952 |
| 2,640,087 | Borton | May 26, 1953 |

FOREIGN PATENTS

| | | |
|---|---|---|
| 611,164 | Great Britain | Oct. 26, 1948 |

OTHER REFERENCES

Chemical Week, April 19, 1952; vol. 70, No. 16: pp. 54.